United States Patent
Tsai (10) Patent No.: US 8,522,397 B1
(45) Date of Patent: Sep. 3, 2013

(54) CASTOR THAT IS CONTROLLED BY A WIRE TO BRAKE AND STOP ROTATING SIMULTANEOUSLY

(76) Inventor: Po-Chuan Tsai, Tainan Hsien (TW)

( * ) Notice: Subject to any disclaimer, the term of this patent is extended or adjusted under 35 U.S.C. 154(b) by 0 days.

(21) Appl. No.: 13/432,059

(22) Filed: Mar. 28, 2012

(51) Int. Cl.
*B60B 33/00* (2006.01)

(52) U.S. Cl.
USPC ............................. 16/35 R; 188/1.12

(58) Field of Classification Search
USPC ............... 16/35 R, 35 D, 18 R, 47; 301/6.1; 188/1.12, 69
See application file for complete search history.

(56) References Cited

U.S. PATENT DOCUMENTS

| 3,409,105 | A | * | 11/1968 | Clinton | 188/29 |
| 4,076,266 | A | * | 2/1978 | Krausz | 280/87.042 |
| 6,865,775 | B2 | * | 3/2005 | Ganance | 16/35 R |
| 8,117,715 | B2 | * | 2/2012 | Tsai et al. | 16/35 R |
| 8,205,297 | B2 | * | 6/2012 | Fallshaw et al. | 16/35 R |
| 8,220,110 | B1 | * | 7/2012 | Chen | 16/35 R |
| 8,302,257 | B2 | * | 11/2012 | Lin | 16/35 R |
| 2012/0311821 | A1 | * | 12/2012 | Eguchi | 16/35 R |

* cited by examiner

*Primary Examiner* — William Miller
(74) *Attorney, Agent, or Firm* — Alan Kamrath; Kamrath IP Lawfirm, P.A.

(57) ABSTRACT

A castor includes a support shaft, a stop ring secured on the support shaft and having a first locking portion, a castor body rotatably mounted on the support shaft, two rollers rotatably mounted on the castor body and each having a second locking portion, a locking module movably mounted on the castor body and movable to engage the first locking portion of the stop ring and the second locking portion of each of the rollers, and a control wire movably mounted on the support shaft and connected with the locking module. Thus, when the castor is locked, each of the rollers is locked by the locking module, and the castor body is locked by the stop ring, so that the castor will stop rotating when being braked to provide a double-braking effect.

18 Claims, 7 Drawing Sheets

CASTOR THAT IS CONTROLLED BY A WIRE TO BRAKE AND STOP ROTATING SIMULTANEOUSLY

BACKGROUND OF THE INVENTION

1. Field of the Invention

The present invention relates to a wheeled vehicle and, more particularly, to a castor for a cart, chair and the like.

2. Description of the Related Art

Figure 1:
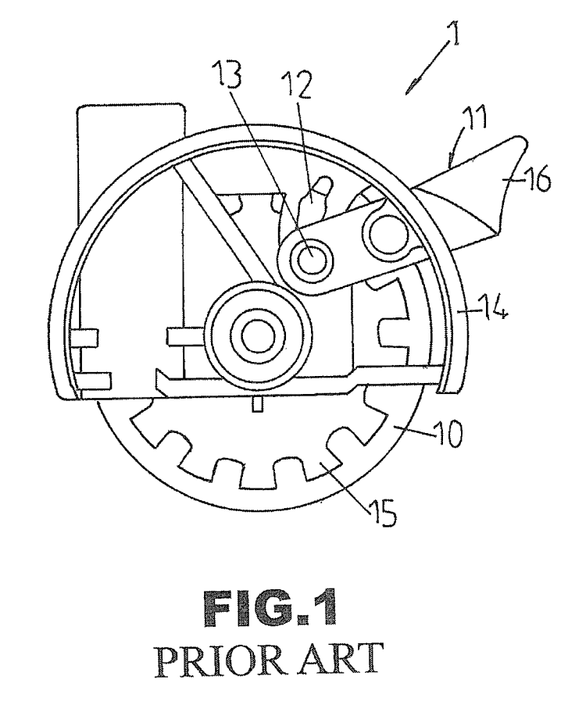
FIG. 1 is a side view of a conventional castor in accordance with the prior art.
Figure 1A:
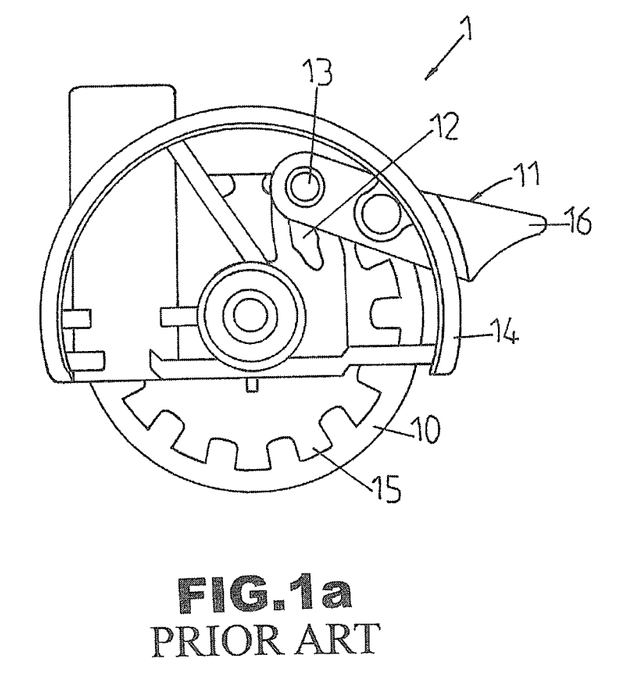
FIG. 1a is a schematic operational view of the conventional castor as shown in FIG. 1.

A conventional castor 1 in accordance with the prior art shown in FIGS. 1 and 1a comprises an upright support shaft (not shown), a castor body 14 rotatably mounted on the support shaft, two rollers 10 rotatably mounted on two opposite sides of the castor body 14 and each having an inner wall provided with a plurality of locking grooves 15, and a brake handle 11 pivotally mounted on the castor body 14 and having a first end provided with a locking rod 13 that is movable relative to the two rollers 10 and a second end provided with a drive portion 16. The castor body 14 is provided with a guide slot 12 to guide movement of the locking rod 13 of the brake handle 11. The locking rod 13 of the brake handle 11 is movable in the guide slot 12 of the castor body 14. In operation, when the drive portion 16 of the brake handle 11 is pressed downward as shown in FIG. 1a, the brake handle 11 is pivoted downward relative to the castor body 14 to drive and move the locking rod 13 in the guide slot 12 of the castor body 14 so that the locking rod 13 of the brake handle 11 is extended into and locked in one of the locking grooves 15 of each of the two rollers 10 to lock each of the two rollers 10 onto the castor body 14 so as to lock the castor 2. However, when the two rollers 10 are braked and stop rotating, the castor body 14 is still rotatable relative to the support shaft so that the castor 1 will be swiveled freely when being braked.

BRIEF SUMMARY OF THE INVENTION

In accordance with the present invention, there is provided a castor, comprising an upright support shaft, a stop ring secured on the support shaft and having an outer wall provided with a toothed first locking portion, a castor body rotatably mounted on the support shaft, two rollers rotatably mounted on two opposite sides of the castor body by a mandrel and each having a side provided with a toothed second locking portion, a locking module movably mounted on the castor body and movable to engage the first locking portion of the stop ring and the second locking portion of each of the rollers, and a control wire movably mounted on the support shaft and connected with the locking module to move the locking module relative to the stop ring and each of the rollers. The locking module is movable in concert with the control wire and has a first end provided with a first locking member and a second end provided with a second locking member. The first locking member of the locking module has a top face provided with a toothed first engaging portion that is movable to engage the first locking portion of the stop ring so as to lock the first locking member of the locking module onto the stop ring. The second locking member of the locking module has two opposite sides each having a top provided with a toothed second engaging portion that is movable to engage the second locking portion of a respective one of the rollers so as to lock each of the rollers onto the second locking member of the locking module.

The primary objective of the present invention is to provide a castor that is controlled by a wire to brake and stop rotating simultaneously so as to provide a double-braking function.

According to the primary advantage of the present invention, when the castor is locked, each of the two rollers is locked by the locking module and cannot be rotated relative to the castor body, and the castor body is locked by the stop ring and cannot be rotated relative to the support shaft, so that the castor will stop rotating when being braked so as to provide a double-braking effect simultaneously.

According to another advantage of the present invention, the castor is braked and stops rotating by pulling the control wire and is unlocked and can be moved freely by pushing the control wire, thereby facilitating a user locking and unlocking the castor.

Further benefits and advantages of the present invention will become apparent after a careful reading of the detailed description with appropriate reference to the accompanying drawings.

DETAILED DESCRIPTION OF THE INVENTION

Referring to the drawings and initially to FIGS. 2-5, a castor 2 in accordance with the preferred embodiment of the present invention comprises an upright support shaft 201, a stop ring 22 secured on the support shaft 201 and having an outer wall provided with a toothed first locking portion 221, a castor body 20 rotatably mounted on the support shaft 201, two rollers 29 rotatably mounted on two opposite sides of the castor body 20 by a mandrel 28 and each having a side provided with a toothed second locking portion 291, two end caps 290 each mounted on a respective one of the rollers 29 to cover the mandrel 28, a locking module 23 movably mounted on the castor body 20 and movable to engage the first locking portion 221 of the stop ring 22 and the second locking portion 291 of each of the rollers 29, and a control wire 21 movably mounted on the support shaft 201 and connected with the locking module 23 to move the locking module 23 relative to the stop ring 22 and each of the rollers 29.

The stop ring 22 has an inner wall provided with a non-circular fixing hole 220 secured on a lower end of the support shaft 201 to combine the stop ring 22 with the support shaft 201. The first locking portion 221 of the stop ring 22 is arranged to have an annular shape.

The castor body 20 is located between the support shaft 201 and the stop ring 22. The castor body 20 has a mediate portion provided with a mounting hole 202 to allow passage of the mandrel 28. The castor body 20 has two opposite sides each provided with a guiding track 203. The castor 2 further comprises a bushing 27 mounted in the mounting hole 202 of the castor body 20 and encircling the mandrel 28. The bushing 27 is located between the mandrel 28 and the castor body 20. Each of the rollers 29 is rotatable on the mandrel 28. The second locking portion 291 of each of the rollers 29 is arranged to have an annular shape.

The locking module 23 is movable in concert with the control wire 21 and has a first end provided with a first locking member 230 and a second end provided with a second locking member 236. The first locking member 230 and the second locking member 236 of the locking module 23 are formed integrally.

The first locking member 230 of the locking module 23 has a substantially cylindrical shape. The first locking member 230 of the locking module 23 has a top face provided with a toothed first engaging portion 235 that is movable to engage the first locking portion 221 of the stop ring 22 so as to lock the first locking member 230 of the locking module 23 onto the stop ring 22. The first engaging portion 235 of the first locking member 230 is arranged to have an annular shape. The first locking member 230 of the locking module 23 has an upper end provided with an upper recess 231 and a lower end provided with a lower recess 232. The lower recess 232 of the first locking member 230 has a size smaller than that of the upper recess 231. The lower recess 232 of the first locking member 230 has a top wall provided with a flange 233. The first locking member 230 of the locking module 23 has a mediate portion provided with a passage 234 connected between the upper recess 231 and the lower recess 232 to allow passage of the control wire 21. The passage 234 of the first locking member 230 is extended through the flange 233.

The second locking member 236 of the locking module 23 has a substantially U-shaped profile. The second locking member 236 of the locking module 23 has two opposite sides each having a top provided with a toothed second engaging portion 238 that is movable to engage the second locking portion 291 of a respective one of the rollers 29 so as to lock each of the rollers 29 onto the second locking member 236 of the locking module 23. The second engaging portion 238 of the second locking member 236 has a flat shape. Each of the two opposite sides of the second locking member 236 is movable in the respective guiding track 203 of the castor body 20 and has a surface provided with an elongate guiding slot 237 slidable on the mandrel 28. The second locking member 236 of the locking module 23 has a bottom face provided with a mounting space 239. The mounting space 239 of the second locking member 236 is disposed the two opposite sides of the second locking member 236.

The castor 2 further comprises a fixing member 25 secured in the lower recess 232 of the first locking member 230, an elastic buffering member 24 received in the lower recess 232 of the first locking member 230 and biased between the first locking member 230 of the locking module 23 and the fixing member 25, and an elastic member 26 biased between the castor body 20 and the second locking member 236 of the locking module 23. The fixing member 25 has a substantially inverted T-shaped profile and has a top provided with a protrusion 251. The buffering member 24 has an upper end mounted on the flange 233 of the first locking member 230 and a lower end mounted on the protrusion 251 of the fixing member 25. The elastic member 26 has a size smaller than that of the buffering member 24 and has an upper end pressing a bottom of the castor body 20 and a lower end mounted in the mounting space 239 of the second locking member 236.

The control wire 21 is extended through the support shaft 201 and has an upper end protruding outward from an upper end of the support shaft 201. The control wire 21 has a lower end extended through the upper recess 231 of the first locking member 230, the passage 234 of the first locking member 230, the lower recess 232 of the first locking member 230, the buffering member 24 and the fixing member 25 and secured on a bottom of the fixing member 25.

Figure 2:
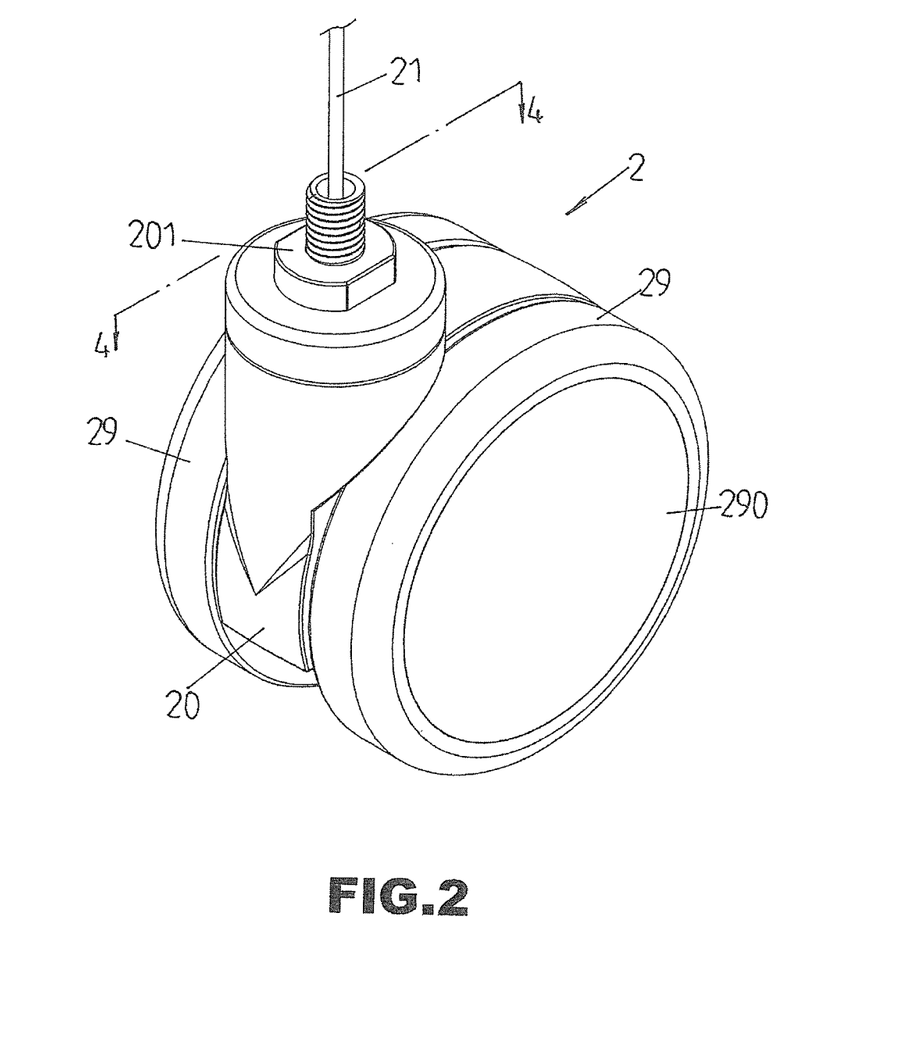
FIG. 2 is a partially perspective view of a castor in accordance with the preferred embodiment of the present invention.
Figure 3:
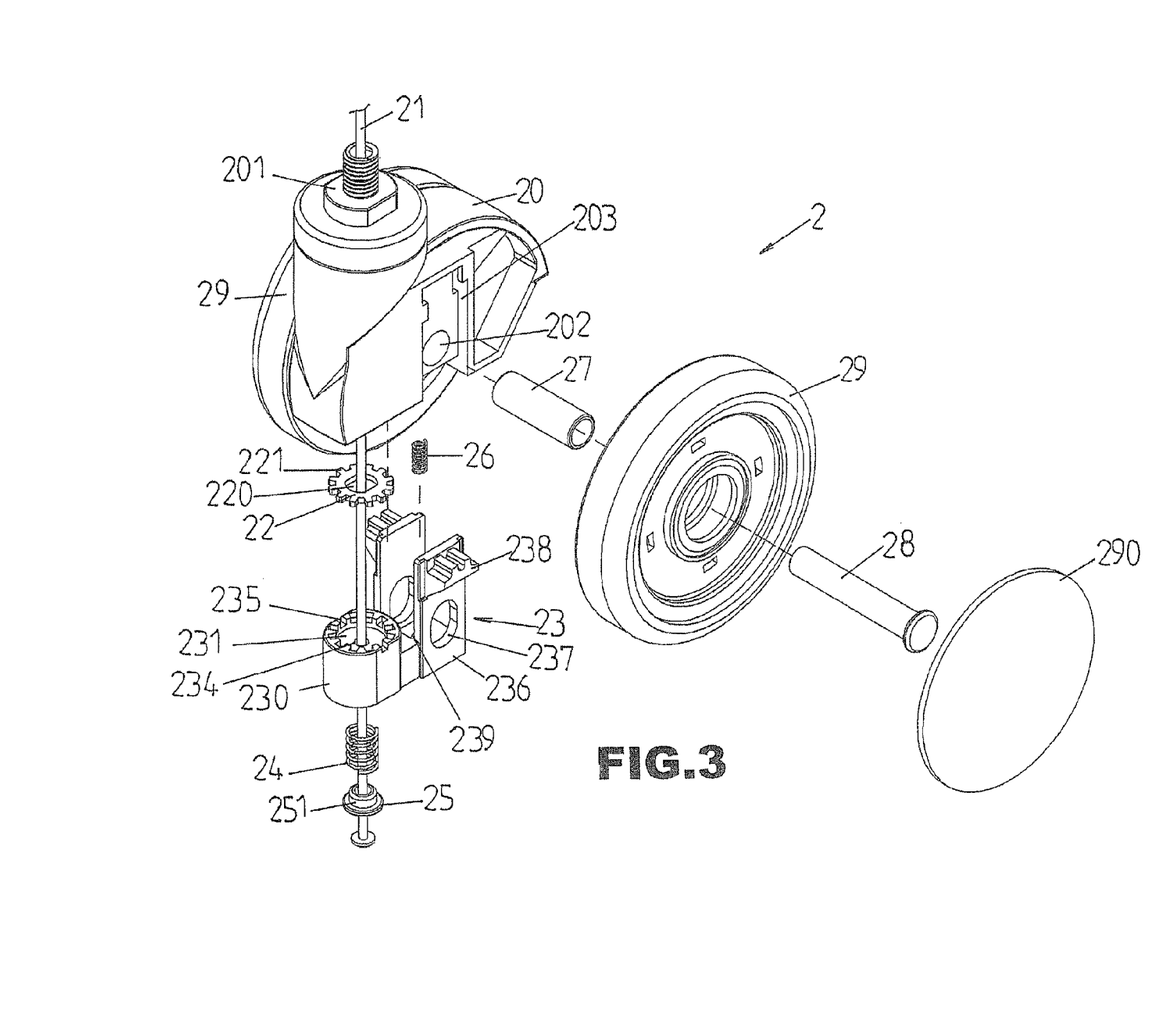
FIG. 3 is an exploded perspective view of the castor as shown in FIG. 2.
Figure 4:
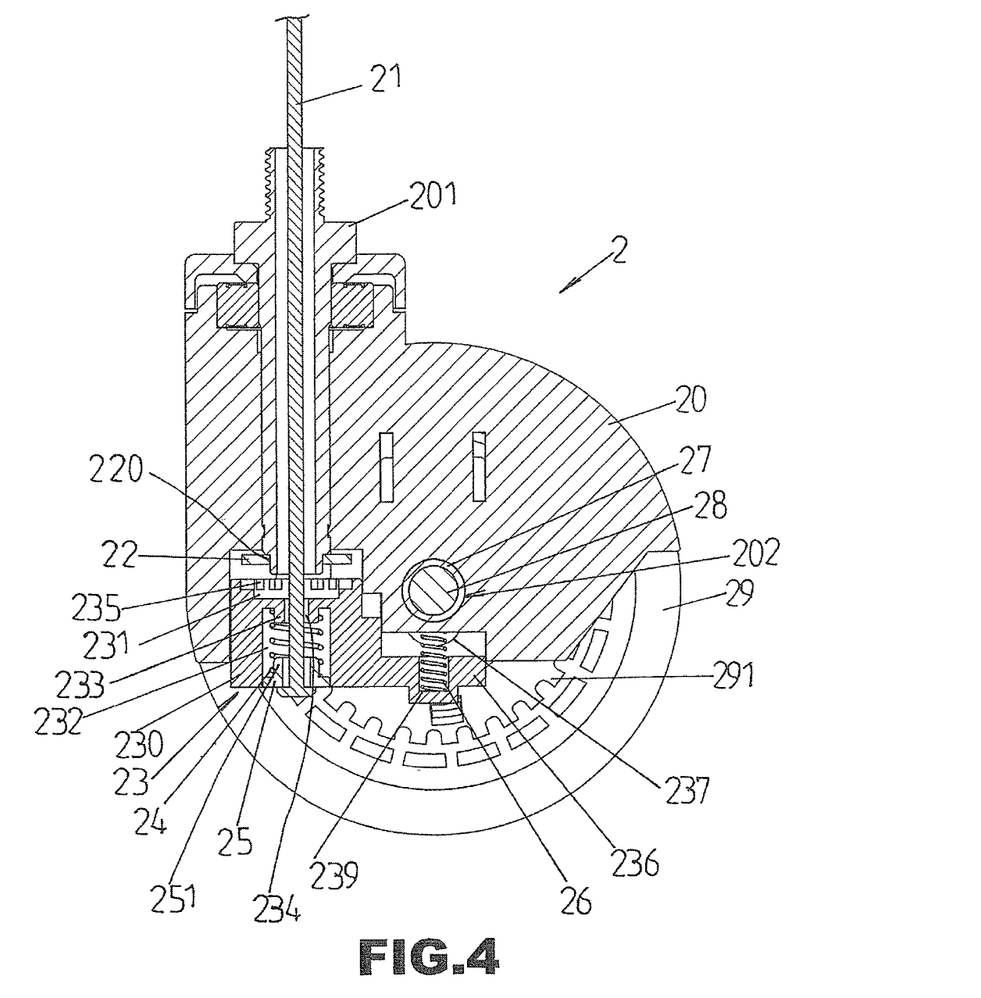
FIG. 4 is a cross-sectional view of the castor taken along line 4-4 as shown in FIG. 2.
Figure 5:
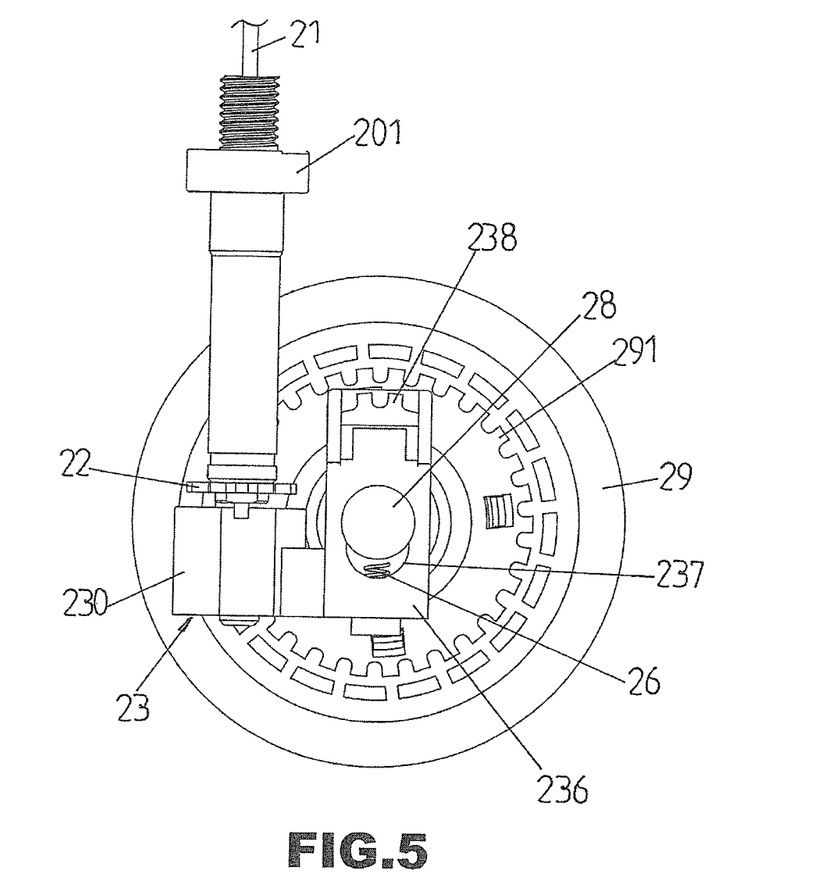
FIG. 5 is a partially broken side view of the castor as shown in FIG. 2.
Figure 6:
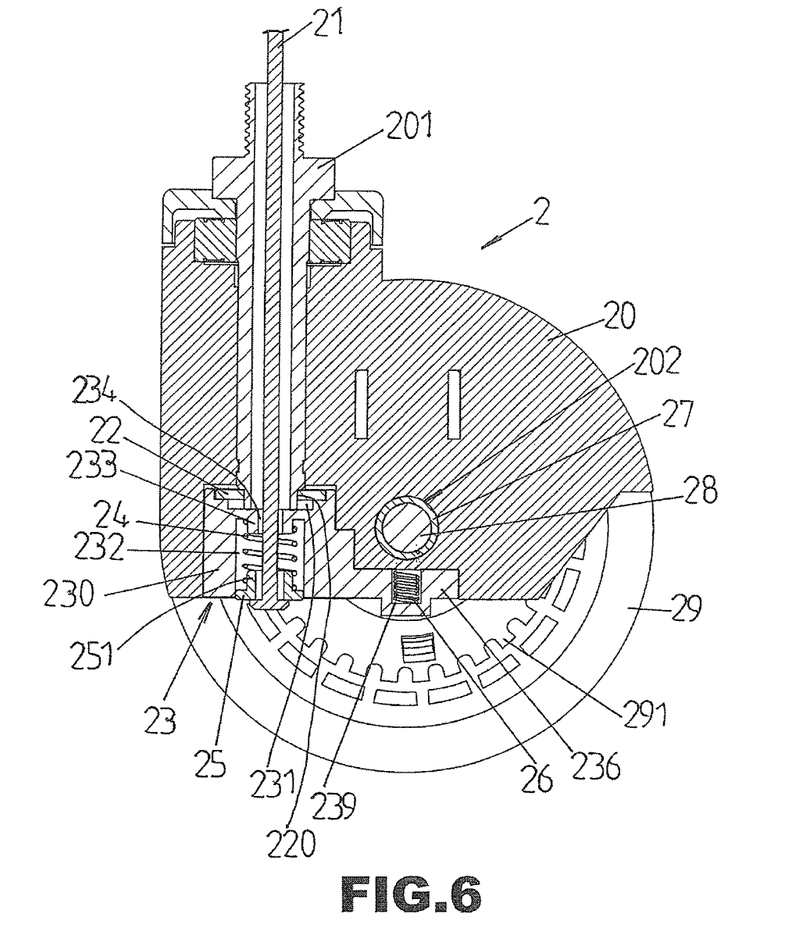
FIG. 6 is a schematic operational view of the castor as shown in FIG. 4.
Figure 7:
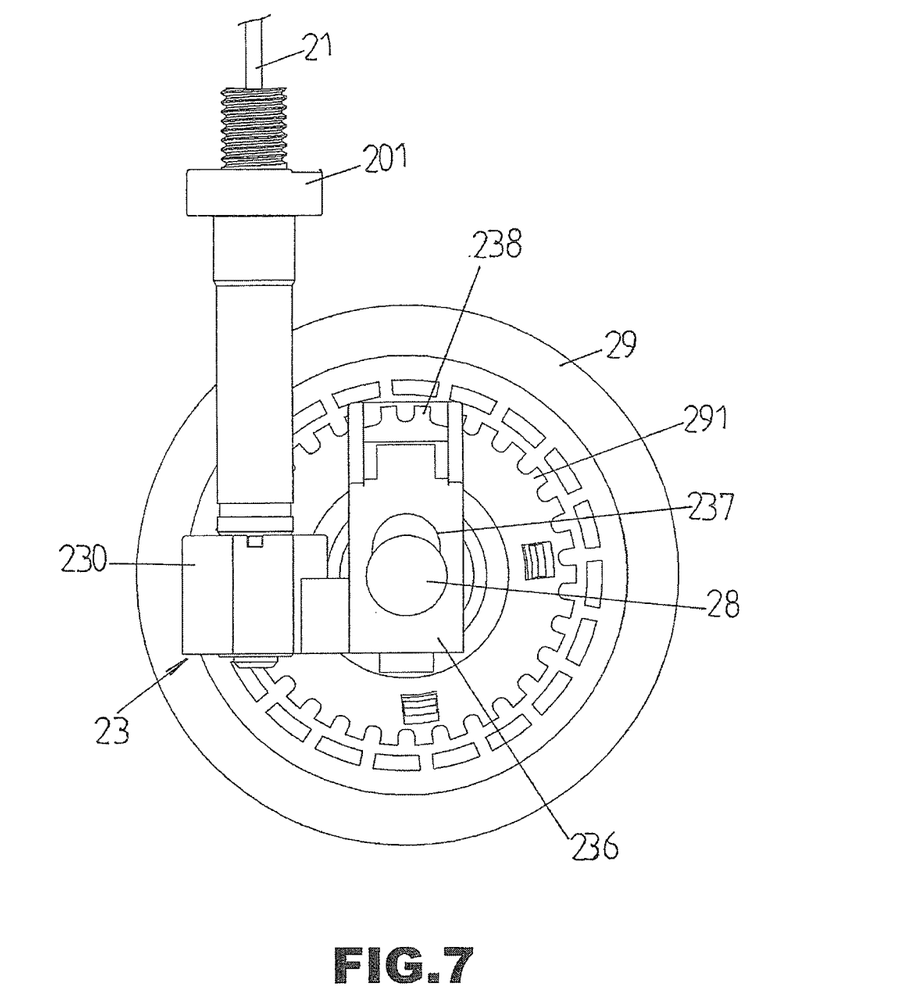
FIG. 7 is a schematic operational view of the castor as shown in FIG. 5.

In operation, referring to FIGS. 4-7 with reference to FIGS. 2 and 3, when the control wire 21 is pulled upward, the locking module 23 is moved upward by the control wire 21 so that the first engaging portion 235 of the first locking member 230 is moved upward to engage the first locking portion 221 of the stop ring 22 as shown in FIG. 6 so as to lock the first locking member 230 of the locking module 23 onto the stop ring 22, while the second engaging portion 238 of the second locking member 236 is also moved upward to engage the second locking portion 291 of each of the rollers 29 as shown in FIG. 7 so as to lock each of the rollers 29 onto the second locking member 236 of the locking module 23. In such a manner, when the control wire 21 is pulled upward, each of the rollers 29 is braked by the second locking member 236 of the locking module 23 so that each of the two rollers 29 is locked onto and cannot be rotated relative to the castor body 20, while the first locking member 230 of the locking module 23 is locked by the stop ring 22 so that the castor body 20 is locked onto and cannot be rotated relative to the support shaft 201.

At this time, when the first engaging portion 235 of the first locking member 230 is moved upward to engage the first locking portion 221 of the stop ring 22, the buffering member 24 provides an elastic buffering effect between the locking module 23, the stop ring 22 and each of the two rollers 29, so that the first engaging portion 235 of the first locking member 230 engages the first locking portion 221 of the stop ring 22 smoothly and stably, and the second engaging portion 238 of the second locking member 236 engages the second locking portion 291 of each of the rollers 29 smoothly and stably.

On the contrary, when the control wire 21 is pushed downward, the locking module 23 is moved downward by the control wire 21 so that the first engaging portion 235 of the first locking member 230 is moved downward to disengage the first locking portion 221 of the stop ring 22 as shown in FIG. 4 so as to unlock the first locking member 230 of the locking module 23 from the stop ring 22, while the second engaging portion 238 of the second locking member 236 is also moved downward to disengage the second locking portion 291 of each of the rollers 29 as shown in FIG. 5 so as to unlock each of the rollers 29 from the second locking member 236 of the locking module 23. In such a manner, when the control wire 21 is pushed downward, each of the rollers 29 is unlocked from the second locking member 236 of the locking module 23 so that each of the two rollers 29 can be rotated relative to the castor body 20, while the first locking member 230 of the locking module 23 is unlocked from the stop ring 22 so that the castor body 20 is unlocked from and can be rotated freely relative to the support shaft 201.

It is appreciated that, the guiding slot 237 of the second locking member 236 is slidable on the mandrel 28 when the second locking member 236 of the locking module 23 is moved relative to the castor body 20 to guide movement of the second locking member 236. In such a manner, when the second engaging portion 238 of the second locking member 236 is moved downward to disengage the second locking portion 291 of each of the rollers 29, the top of the guiding slot 237 abuts the mandrel 28 as shown in FIG. 5, and when the second engaging portion 238 of the second locking member 236 is moved upward to engage the second locking portion 291 of each of the rollers 29, the bottom of the guiding slot 237 abuts the mandrel 28 as shown in FIG. 7.

Accordingly, when the castor 2 is locked, each of the two rollers 29 is locked by the locking module 23 and cannot be rotated relative to the castor body 20, and the castor body 20 is locked by the stop ring 22 and cannot be rotated relative to the support shaft 201, so that the castor 2 will stop rotating when being braked so as to provide a double-braking effect simultaneously. In addition, the castor 2 is braked and stops rotating by pulling the control wire 21 and is unlocked and can be moved freely by pushing the control wire 21, thereby facilitating a user locking and unlocking the castor 2. Further, when the first engaging portion 235 of the first locking member 230 is moved upward to engage the first locking portion 221 of the stop ring 22, the buffering member 24 provides an elastic buffering effect, so that the first engaging portion 235 of the first locking member 230 engages the first locking portion 221 of the stop ring 22 smoothly and stably, and the second engaging portion 238 of the second locking member 236 engages the second locking portion 291 of each of the rollers 29 smoothly and stably.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A castor, comprising:
an upright support shaft;
a stop ring secured on the support shaft and having an outer wall provided with a toothed first locking portion;
a castor body rotatably mounted on the support shaft;
two rollers rotatably mounted on two opposite sides of the castor body by a mandrel and each having a side provided with a toothed second locking portion;
a locking module movably mounted on the castor body and movable to engage the first locking portion of the stop ring and the second locking portion of each of the rollers; and
a control wire movably mounted on the support shaft and connected with the locking module to move the locking module relative to the stop ring and each of the rollers;
wherein the locking module is movable in concert with the control wire and has a first end provided with a first locking member and a second end provided with a second locking member;
the first locking member of the locking module has a top face provided with a toothed first engaging portion that is movable to engage the first locking portion of the stop ring so as to lock the first locking member of the locking module onto the stop ring;
the second locking member of the locking module has two opposite sides each having a top provided with a toothed second engaging portion that is movable to engage the second locking portion of a respective one of the rollers so as to lock each of the rollers onto the second locking member of the locking module.

2. The castor of claim 1, wherein
the first locking member of the locking module has an upper end provided with an upper recess and a lower end provided with a lower recess;
the castor further comprises:
a fixing member secured in the lower recess of the first locking member;
an elastic buffering member received in the lower recess of the first locking member and biased between the first locking member of the locking module and the fixing member; and
an elastic member biased between the castor body and the second locking member of the locking module.

3. The castor of claim 2, wherein
the first locking member of the locking module has a mediate portion provided with a passage connected between the upper recess and the lower recess to allow passage of the control wire;
the control wire is extended through the support shaft and has an upper end protruding outward from an upper end of the support shaft;
the control wire has a lower end extended through the upper recess of the first locking member, the passage of the first locking member, the lower recess of the first locking member, the buffering member and the fixing member and secured on a bottom of the fixing member.

4. The castor of claim 3, wherein
the lower recess of the first locking member has a top wall provided with a flange;
the fixing member has a top provided with a protrusion;
the buffering member has an upper end mounted on the flange of the first locking member and a lower end mounted on the protrusion of the fixing member.

5. The castor of claim 4, wherein the passage of the first locking member is extended through the flange.

6. The castor of claim 2, wherein
the second locking member of the locking module has a bottom face provided with a mounting space;
the elastic member has an upper end pressing a bottom of the castor body and a lower end mounted in the mounting space of the second locking member.

7. The castor of claim 6, wherein the mounting space of the second locking member is disposed the two opposite sides of the second locking member.

8. The castor of claim 2, wherein the fixing member has a substantially inverted T-shaped profile.

9. The castor of claim 2, wherein the elastic member has a size smaller than that of the buffering member.

10. The castor of claim 2, wherein the lower recess of the first locking member has a size smaller than that of the upper recess.

11. The castor of claim 1, wherein
the castor body has a mediate portion provided with a mounting hole to allow passage of the mandrel;
the castor further comprises a bushing mounted in the mounting hole of the castor body and encircling the mandrel;
the bushing is located between the mandrel and the castor body;
each of the rollers is rotatable on the mandrel.

12. The castor of claim 11, wherein each of the two opposite sides of the second locking member has a surface provided with an elongate guiding slot slidable on the mandrel.

13. The castor of claim 1, wherein the first locking member of the locking module has a substantially cylindrical shape.

14. The castor of claim 1, wherein the second locking member of the locking module has a substantially U-shaped profile.

15. The castor of claim 1, wherein the first locking member and the second locking member of the locking module are formed integrally.

16. The castor of claim 1, wherein
the first locking portion of the stop ring is arranged to have an annular shape;

the second locking portion of each of the rollers is arranged to have an annular shape;

the first engaging portion of the first locking member is arranged to have an annular shape;

the second engaging portion of the second locking member has a flat shape.

17. The castor of claim 1, wherein the castor body is located between the support shaft and the stop ring;

the stop ring has an inner wall provided with a non-circular fixing hole secured on a lower end of the support shaft to combine the stop ring with the support shaft.

18. The castor of claim 1, wherein the castor body has two opposite sides each provided with a guiding track;

each of the two opposite sides of the second locking member is movable in the respective guiding track of the castor body.

* * * * *